Feb. 8, 1927.
J. M. LEA
1,616,585
STORAGE BATTERY MANUFACTURE
Filed Aug. 1, 1921
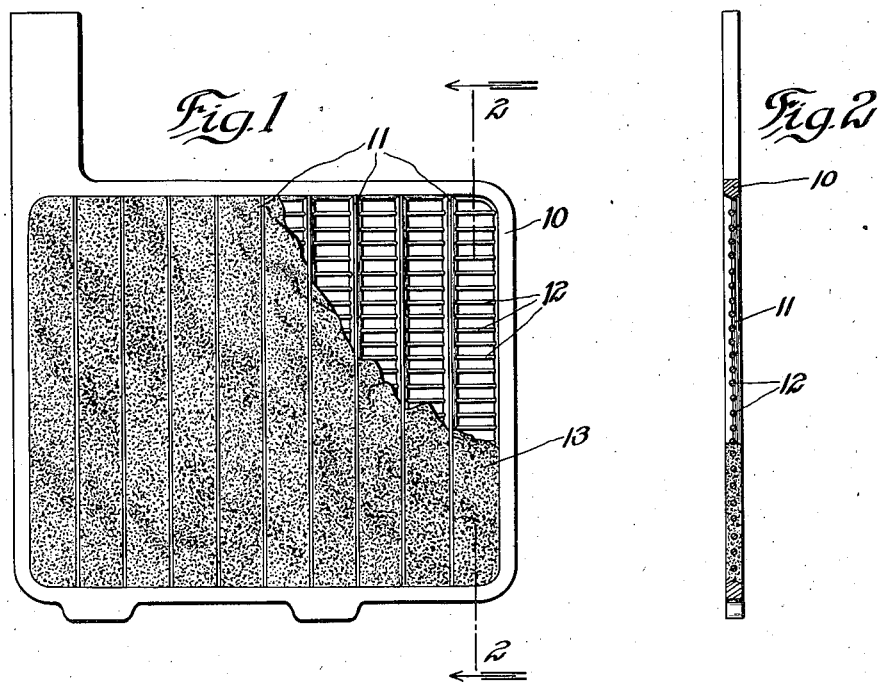
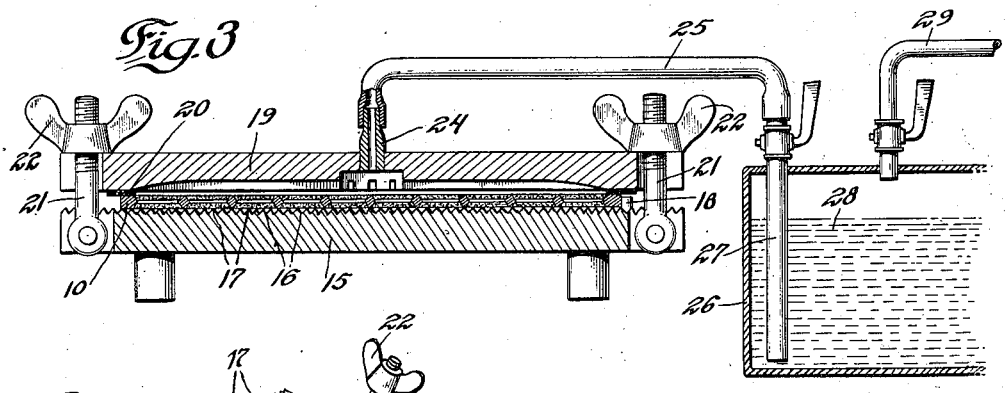
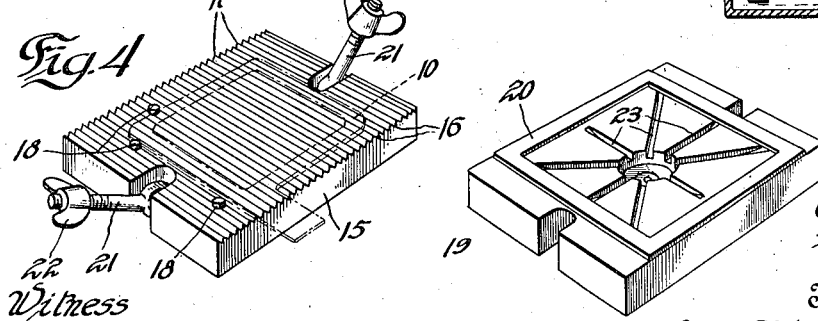
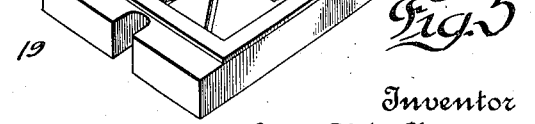
Inventor
John M. Lea
By his Attorneys
Blackmore Spencer + Flint Patented Feb. 8, 1927.

1,616,585

UNITED STATES PATENT OFFICE.

JOHN M. LEA, OF DETROIT, MICHIGAN.

STORAGE-BATTERY MANUFACTURE.

Application filed August 1, 1921. Serial No. 488,964.

The invention relates to electric storage batteries and processes for their manufacture, and is more particularly concerned with batteries of the lead-sulphuric-acid type.

The manufacture of batteries of this type by the Faure method comprises generally the steps of mixing a paste, applying the same to the supports or "grids", drying or "setting" the paste, increasing the content of sulphate by "pickling" in dilute sulphuric acid, and then subjecting the battery elements to action of an electric current to "form" them, i. e., convert a portion of the sulphate present in the plate into the active materials desired, viz, sponge lead in the negative element and lead peroxide in the positive element. In the ordinary commercial practice the production of a complete charged battery by the process referred to generally requires about ten days.

In addition to the excessive time required, this process involves other undesirable features. The setting of the paste by exposure to the atmosphere, either at ordinary temperatures or at an elevated temperature, results in shrinkage as evidenced by the production of numerous cracks.

Since the pickling solution penetrates slowly inward from the exterior surfaces of the plate and the sides of the cracks, the action is not uniform throughout the mass, and the products of reaction are formed in excess adjacent the exposed surfaces. Clogging of the pores by sulphate or sulphate and peroxide, which are, of course, of greater mass than the oxides from which they were produced, tends to still further obstruct the progress of the reaction within the plate. For example, I have found in practice that the reaction penetrated four times deeper in some sections of a plate than in others, and that while the surface was gray with deposited sulphate, the interior was still bright with unchanged red lead, even after twenty hours immersion in acid of 1.150 sp. gr.

Unequal distribution of the increased mass naturally results in unequal expansion tending to cause buckling and loosening of the pellets. Excess sulphate on the surface or unequally distributed within the plate decreases the conductivity of the more highly sulphated sections necessitating longer application of current to effect reduction with attendant overformation and premature gassing in other sections.

Buckling caused by non-uniform sulphation, when once started, is also aggravated throughout the life of the battery and frequently causes rupture of the insulating or separating elements with resultant short circuits. Plates thus prepared also require "formation" at a very slow rate, the current and temperature being maintained relatively low. The primary object of my invention is to eliminate the defects referred to above with others incident to the manufacture of battery elements in accordance with ordinary commercial practice, and to produce a battery of increased efficiency with a great saving of time and labor.

A further object is to provide an improved process for treating pasted battery elements whereby the reactions precedent to formation by the electric current may be more quickly completed and with greater excellence in the character and uniformity of the product.

A further object is to provide an improved process for the treatment of pasted battery elements whereby the introduction of an electrolyte or other reagent into the mass of active material may be facilitated and expedited, and the products of reaction may be predetermined in quantity and uniformly distributed throughout the mass.

A further object is to produce a battery or element therefor having a high degree of uniformity in its physical and chemical characteristics and possessing marked advantages in its electrical capabilities.

Further objects and advantages will appear from the following description taken in connection with the accompanying drawings, in which—

Figure 1 is an elevation, broken away in part, showing a battery element of a form in the manufacture of which my invention may be embodied;

Figure 2 is a section on line 2—2 of Figure 1.

Figure 3 is a sectional elevation showing one form of apparatus which may be used in carrying out certain steps in my process, and Figures 4 and 5 are perspective views of parts of the apparatus shown in Figure 3.

In the application of my process to the production of plates or similar elements for a lead storage battery, the oxides employed may be mixed in the usual manner with a dilute solution of sulphuric acid and the paste so produced spread upon the support or grid. While still wet, or after preliminary setting or drying, the pasted element is mounted in any suitable manner whereby liquid may be applied to one side thereof under pressure, and the reagent to be utilized, for example, dilute sulphuric acid, is permitted to act upon the material from one side, sufficient pressure being employed to cause the liquid to penetrate into and preferably flow through the element to the opposite side.

In the treatment of elements composed of litharge, it is sufficient to cause the liquid to flow in one direction only through the element, but if the content of red lead in the mixture is large, as is usual in mixtures employed for positive pole elements, the formation of peroxide in addition to the sulphate may clog the pores of the material. Buckling may also occur, the mass expanding on the side from which the acid flows and producing convexity upon that side, it being understood, of course, that the solution becomes continuously weaker as it passes through the paste due to the abstraction of acid by the progress of the reaction. It may therefore be preferable in some cases, in order to prevent non-uniform action upon the plate material, to cause the liquid to flow through the plate first from one side and then from the other as described below.

As a specific example of the application of the process to freshly pasted plates, i. e., to plates treated immediately after pasting before the material has been permitted to "set" by exposure to air, I have obtained very satisfactory results by treatment of positive plates containing litharge with ten percent of red lead, applying sulphuric acid of 1.4 sp. gr. under five pounds per square inch pressure for two minutes from one side of the plate, and then three minutes from the other side, after which the plates were permitted to stand for approximately twenty hours in electrolyte of 1.05 sp. gr. Negative plates first subjected to the forced sulphation under pressure as above and then permitted to stand for twenty hours in water, were then treated again for two minutes with 1.4 sp. gr. acid under pressure. The plates so prepared may be assembled in cells using an electrolyte with only sufficient acid to provide conductivity, and subjected to "forming" current.

In the treatment of freshly pasted plates it may be desirable to employ acid of higher gravity (e. g. approximately 1.4 sp. gr.) than would be necessary if the plates were already set, since the liquid penetrating through the plate will then not be so dilute as to loosen the fresh paste from the grid due to the reaction with water alone. A partial setting, however, may be accomplished by preliminary dipping of the wet plates in electrolyte preferably of 1.4 gravity, thus hardening the surface sufficiently to withstand the effects of dilution of the reagent and also preventing air cracks should the plate be exposed to air previous to treatment. If a light weight oxide is employed, which is subject to excessive shrinkage in air drying, it has been found advisable to dip the plate in acid unless the pressure treatment is applied within a few minutes after pasting, the time varying somewhat with conditions. If immersed in acid immediately or within a few minutes after pasting, the plates may be permitted to stand an indefinite time without danger of cracking.

Preferably after sulphation I store the treated plates in water until ready for assembly and formation. If the sulphated plates are permitted to dry for a period of time, say 48 hours, the sulphate appears to undergo a change whereby its conductivity is decreased and rupture is likely to occur during formation at the high rate which I prefer to employ.

If the pressure treatment is applied to previously dried or "set" paste, it will be essential, of course, that the material be substantially free from cracks in order to enable the liquid to be placed under required super-atmospheric pressure, and to ensure flow through the paste rather than through the cracks. For this reason it will be desirable for the setting to be carried out by some accelerated method, as by heating in a chamber under high pressure, or that the oxide selected be such as will undergo only slight shrinkage upon drying. In the treatment of dried paste I prefer to immerse the plates in water before applying the acid.

The possible extent of the reaction as measured by the increase in weight of the plate varies, of course, with the time during which the treatment is continued, but I have found that treatment for a few minutes, say five to ten, will result in almost as great increase in weight as continuation of the treatment for an hour or two. If, however, the treated element be permitted to stand for some time and then re-treated, the total content of products of the reaction can be considerably raised. It will be noted therefore that accurate timing of the duration of treatment is not necessary when it is desired to introduce substantially the maximum amount of electrolyte which will be retained by a given plate of given paste composition and condition since, after the minimum time of subjection to treatment, say five minutes, the continuance of the treatment produces only slight increase of the acid content. The reaction which then occurs, however, between the acid so introduced and the paste ingredients appears to require some time for its completion.

The possible extent of the reaction varies also with the condition of the paste. A plate the weight of which could be increased fourteen grams by treatment immediately after pasting was capable of only ten grams increase if permitted to set for a half hour after pasting and only seven grams if the setting had proceeded for fifteen hours, the time of treatment being the same in each case. It will be seen, therefore, that by proper control of the factors involved, such as the time or extent of the preliminary setting of the paste, the time of subjection to the forced sulphation, and the strength of the acid, the quantity of products of reaction developed in the plate may be controlled at will, thus rendering it possible by separate treatment of the positive and negative elements, to induce the amount of chemical combination most suitable to each, and also to prepare the plates with substantially perfect uniformity with the desired content of sulphate for subsequent cell formation in jars or for development of the most satisfactory electrical characteristics.

In the manufacture of battery plates, I prefer to use, because of its well-known advantages, a support of the embedded or centre-wire type. A grid of this type is shown in Figures 1 and 2 of the accompanying drawings, the grid comprising an outer frame 10, vertical bars 11 of diamond shape in cross section, the edges of which bars extend to the surface of the paste to serve as a guide in pasting, and horizontal centre wires 12. The wires or rods 12 are wholly embedded within the paste 13 and are protected thereby from direct contact with electrolyte. The lack of homogeneity in the active material as produced by ordinary processes has rendered impracticable the general use of supports of this type, inasmuch as the non-uniform changes in mass have rendered advisable the use of retaining bars on the plate surface to prevent loss of pellets; also the lack of adequate interior sulphation made it necessary to place the conducting bars on the surface where the sulphate was most abundant to facilitate original formation. With my process, however, the uniformity of distribution of the sulphate and resulting uniformity in chemical and physical action, together with the avoidance of shrinkage and freedom from cracks, enable me to employ the embedded type of support and to secure thereby the attendant advantages of long life, relatively large active surface and high rate of charge and discharge. The specific details of this support or grid may, of course, be greatly varied, the form illustrated being one of numerous forms which have been known in the art for many years.

I have found that battery elements prepared in accordance with my invention are capable of being formed by passage of current therethrough at a much higher rate than has been heretofore deemed possible. In fact, I have customarily employed with satisfactory results forming current supplied at a rate which invariably causes buckling, scaling, or disruption when applied to plates prepared by the ordinary commercial methods previously referred to. Not only may the rate of formation be greatly increased and the time required reduced, but the total current necessary is much less. For example, I have been able to form plates successfully with 175 to 200 ampere hours of current applied at a rate reaching a maximum of 14 to 15 amperes per positive plate in a total time of 8 hours, as compared with 300 or more ampere hours at a rate not exceeding 0.6 to 1.0 ampere per positive plate and a total forming period of 72 hours which is usual commercial practice for plates of type and size corresponding to those I have employed.

These results are believed to be due to the fact that the material treated by my process is much more completely prepared for the electro-chemical action and is much more homogeneous than in ordinary practice, and hence the current distribution is much more uniform and the formation proceeds with a higher degree of efficiency. The high forming rate employed, of course, develops high temperatures, 140 to 150 degrees F. in formation in jars being normal in my experience, without, however, producing any deleterious results. In fact, the high temperature appears to accelerate the chemical action and progressive sulphation which must necessarily accompany the forming action.

It will be appreciated that the application of hydraulic pressure of the extent indicated (five pounds or more to the square inch) to force reagent through the paste, whether or not the latter be preliminarily dried or set, would distort the grid and rupture and dislodge the paste unless some means were provided to support the paste upon the low-pressure side. My invention contemplates, therefore, the use of a backing of such character as will insure the necessary support and at the same time permit the flow of liquid through the element under treatment. On the accompanying drawings, Figures 3 to 5, is shown one form of apparatus adapted to carry out certain steps of my process and including a supporting device particularly designed to cooperate with battery elements of the plate form shown in Figure 1.

In the apparatus illustrated, 15 indicates a base plate or support having on one surface alternate ridges 17 and grooves 16. Pins 18 may be provided to position on the support 15 a battery plate 10. A cover plate 19 having thereon a gasket 20 of a form and size adapted to fit the frame of the plate 10 is adapted to be placed over the support 15 and be removably secured thereto as by bolts 21 and wing-nuts 22. Channels 23 may be formed in the surface of cover 19 to facilitate the removal of air pockets from the surface of the battery plate. A conduit 24 extends through the cover 19 and is connected as by a flexible tube 25 with a tank 26, the tube 25 being attached to a standpipe 27 leading to a point below the surface of the liquid reagent 28 within the tank. A pressure conduit 29 extending to any suitable source of pressure medium (not shown) provides means whereby any desired pressure may be applied to the liquid in tank 26. The liquid may therefore be caused to flow through the conduits 27, 25, 24 and be applied under the desired pressure to the one surface of the battery plate, and by reason of the differential pressure upon the two sides of the latter, the liquid is forced through the paste as a diaphragm, escaping freely on the under side through the grooves in the support 15.

After the treatment of the plate by passing the electrolyte therethrough in one direction has been completed the plate may be reversed in position on the support and electrolyte applied under pressure to the other side to cause flow through the paste in the opposite direction.

One important effect of the apparatus consists in the holding of the plate by hydraulic pressure in a true plane on the machined backing while treatment with acid and consequent hardening is taking place. The pressure is even sufficient to remove slight distortions from the grid. The perfect trueness of the plate due to this action, added to the uniformity of chemical constitution caused by the high-speed penetration of the reagent, will practically eliminate plate buckling during the life of the battery.

The process presents the great commercial advantage of enabling the working time required for the manufacture of a complete battery to be reduced from ten or twelve days, as at present customary, to ten hours or less, with a corresponding saving in cost of production. Furthermore, it is possible to predetermine so definitely and accurately the characteristics of the product that assembly of battery elements in their permanent conainer and subsequent formation are entirely feasible commercially, testing being confined to the determination of electrical characteristics without inspection of the plates or other interior parts of the cell.

In addition to the obtaining of high and uniform initial conductivity and uniform distribution of the ingredients capable of conversion by the current, the process also enables battery elements to be prepared in which the content is that most favorable for the development of high voltage and capacity characteristics. Furthermore, the elements may be given the acid content necessary for complete formation, enabling formation to be carried on in a substantially neutral electrolyte, and thereby eliminating the excess and localized sulphation which occurs when forming takes place in a strongly acid electrolyte.

It will be understood that the apparatus employed will be varied in accordance with the specific character of elements to be treated and may be otherwise modified in many respects, the structure shown being merely illustrative of one type of apparatus which has been found suitable for the purpose. Various changes may also be made in the details of the process, such as the nature of the elements employed, the character of reagent applied thereto, and many other features of the invention, without departing from the spirit and scope of the invention, and therefore I do not wish to be limited to the specific procedure set forth except as required by the language of the appended claims in view of the prior art.

I claim:

1. In the manufacture of electric storage battery elements, the process which comprises the passing of a liquid reagent through the element as a diaphragm by application of pressure.

2. The process of treating pasted battery plates which comprises applying to the plate after pasting and before forming, a liquid reagent under pressure and causing the reagent to flow entirely through the material of the plate.

3. The process of treating electric storage battery elements containing lead oxide which comprises the passing of a solution of sulphuric acid therethrough under pressure.

4. The process of treating electric storage battery elements containing lead oxide which comprises the passage of a solution of sulphuric acid through said element under pressure, first in one direction and subsequently in the opposite direction.

5. The process of manufacturing pasted battery elements which comprises applying a paste to a suitable support, subjecting the freshly pasted element to action of a suitable liquid reagent under pressure to cause the liquid to flow entirely through the paste.

6. The process of treating pasted battery plates which comprises supporting one side of the plate in such manner as to prevent distortion thereof by pressure acting upon the opposite side while permitting flow of fluid therethrough, applying under pressure to the opposite side of the plate a fluid containing a reagent adapted to act chemically upon the plate material, and causing said fluid to flow through the plate.

7. The process of treating pasted battery plates which comprises applying to one side of the plate a liquid reagent under pressure, causing the liquid to flow through the plate, and supporting the other side of the plate at spaced areas sufficient to prevent distortion of the plate under the pressure of the liquid while permitting the escape between said areas of the liquid flowing through the plate.

8. The process of manufacturing an electric storage battery comprising the application of lead oxide paste to grids, causing deposition of sulphate in said paste by flow of liquid reagent therethrough, assembling the plates so produced in suitable electrolyte to constitute battery units, and forming the plates by passage of electric current therethrough.

9. The process of manufacturing an electric storage battery comprising the application of lead oxide paste to grids, imparting to said paste sufficient acid content to permit complete formation of the plates to most desirable voltage and capacity characteristics by passage of electric current therethrough, assembling the plates in an electrolyte substantially neutral in its action upon the paste, and completing the formation by electric current.

10. The process of manufacturing an electric storage battery plate which comprises applying to a suitable grid a lead oxide paste, and causing a solution of sulphuric acid to flow through said paste from one side of the plate to the other before the paste has been dried.

11. The process of manufacturing an electric storage battery plate which comprises applying to a suitable grid a lead oxide paste, and causing a solution of sulphuric acid to flow through said paste first from one side of the plate and then from the other thereby promoting uniformity of the reaction throughout the plate.

12. The process of manufacturing an electric storage battery plate which comprises applying to a suitable grid a lead oxide paste, preliminarily treating the exterior of said paste with a hardening agent to set the material on the surface and then causing a solution of sulphuric acid to pass through the plate from one side to the other.

In testimony whereof I affix my signature.

JOHN M. LEA.